(12) United States Patent
Delorenzis et al.

(10) Patent No.: US 12,291,064 B2
(45) Date of Patent: May 6, 2025

(54) DAMPING AIR SPRING FOR HEAVY-DUTY VEHICLE AXLE/SUSPENSION SYSTEMS

(71) Applicant: Hendrickson USA, L.L.C., Schaumburg, IL (US)

(72) Inventors: Damon Delorenzis, Plainfield, IL (US); Jeff R. Zawacki, Channahon, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 430 days.

(21) Appl. No.: 17/884,752

(22) Filed: Aug. 10, 2022

(65) Prior Publication Data

US 2023/0069043 A1 Mar. 2, 2023

Related U.S. Application Data

(60) Provisional application No. 63/237,825, filed on Aug. 27, 2021.

(51) Int. Cl.
*B60G 15/12* (2006.01)
*F16F 9/04* (2006.01)
*F16F 9/05* (2006.01)

(52) U.S. Cl.
CPC .......... *B60G 15/12* (2013.01); *B60G 2202/30* (2013.01); *B60G 2206/40* (2013.01); *B60G 2800/162* (2013.01)

(58) Field of Classification Search
CPC ............. B60G 15/12; B60G 2800/162; B60G 2206/204; B60G 2202/30; B60G 11/27; B60G 2206/8201; B60G 2206/73; B60G 2206/424; B60G 2202/152; F16F 9/084; F16F 9/0454
See application file for complete search history.

(56) References Cited

U.S. PATENT DOCUMENTS 3,212,769 A 10/1965 Ishibashi et al.
4,129,025 A * 12/1978 Carey .................... B21D 51/16
  72/348
4,386,791 A * 6/1983 Watanabe ................ G01B 7/28
  280/DIG. 1

(Continued)

FOREIGN PATENT DOCUMENTS

EP 1464865 B1 10/2004

*Primary Examiner* — Robert A. Siconolfi
*Assistant Examiner* — James K Hsiao
(74) *Attorney, Agent, or Firm* — Dureska & Moore, LLC; David P. Dureska; David J. Danko

(57) ABSTRACT

A damping air spring for heavy-duty vehicle axle/suspension systems. The damping air spring includes a piston chamber and a bellows chamber and at least one opening between the chambers to provide restricted fluid communication between the chambers. A relationship between a cross-sectional area of the at least one opening in square inches to a volume of the piston chamber in cubic inches to a volume of the bellows chamber in cubic inches to a mean effective area of the air spring in square inches, or of the at least one opening in square inches to a volume of the piston chamber in cubic inches to a volume of the bellows chamber in cubic inches to a unitless ratio of the volume of the bellows chamber to the volume of the piston chamber, provides damping characteristics to the air spring over a first and second critical range of frequencies.

24 Claims, 5 Drawing Sheets

(56) References Cited

U.S. PATENT DOCUMENTS

| | | | |
|---|---|---|---|
| 4,817,922 A * | 4/1989 | Hovance | B60G 17/052 |
| | | | 280/5.514 |
| 4,854,557 A * | 8/1989 | Goshima | B60G 11/27 |
| | | | 267/64.27 |
| 5,374,077 A | 12/1994 | Penzotti et al. | |
| 6,149,142 A | 11/2000 | Penzotti | |
| 6,173,946 B1 * | 1/2001 | Wode | B60G 11/27 |
| | | | 267/64.19 |
| 6,199,837 B1 * | 3/2001 | Leonard | B60G 11/28 |
| | | | 267/122 |
| 6,513,798 B2 * | 2/2003 | Capek | B60G 11/28 |
| | | | 267/64.19 |
| 6,685,173 B2 * | 2/2004 | Oldenettel | B60G 15/08 |
| | | | 267/122 |
| 6,752,388 B2 * | 6/2004 | Thurow | F16F 9/05 |
| | | | 267/64.27 |
| 7,188,827 B2 * | 3/2007 | Thomae | F16F 9/3292 |
| | | | 267/122 |
| 8,066,265 B2 * | 11/2011 | Leonard | F16F 9/04 |
| | | | 267/190 |
| 8,191,458 B2 * | 6/2012 | Egolf | F16F 9/057 |
| | | | 267/64.24 |
| 8,540,222 B2 | 9/2013 | Westnedge et al. | |
| 8,844,956 B2 | 9/2014 | Boler et al. | |
| 9,127,737 B2 * | 9/2015 | Leonard | B60G 11/27 |
| 9,139,061 B2 | 9/2015 | Delorenzis | |
| 9,157,529 B2 | 10/2015 | Westnedge et al. | |
| 9,738,131 B2 | 8/2017 | Keeler et al. | |
| 9,744,824 B2 | 8/2017 | Fulton et al. | |
| 9,849,745 B2 | 12/2017 | Fulton et al. | |
| 10,118,453 B2 | 11/2018 | Delorenzis | |
| 10,131,196 B2 * | 11/2018 | Suissa | B60G 15/12 |
| 10,843,520 B2 * | 11/2020 | Delorenzis | B60G 9/02 |
| 2006/0066015 A1 * | 3/2006 | Tubbs | B60G 7/04 |
| | | | 267/64.27 |
| 2012/0205844 A1 * | 8/2012 | Koeske | B60G 11/28 |
| | | | 428/34.1 |
| 2014/0167337 A1 | 6/2014 | Ramsey et al. | |
| 2014/0210170 A1 * | 7/2014 | Dehlwes | B60G 11/27 |
| | | | 267/64.27 |
| 2017/0240020 A1 | 8/2017 | Delorenzis et al. | |
| 2017/0241504 A1 | 8/2017 | Delorenzis et al. | |
| 2018/0257449 A1 | 9/2018 | Delorenzis et al. | |
| 2019/0249745 A1 | 8/2019 | Long | |
| 2019/0337346 A1 * | 11/2019 | Delorenzis | B60G 9/003 |
| 2019/0351727 A1 | 11/2019 | Zawacki et al. | |
| 2019/0366789 A1 | 12/2019 | Naples et al. | |
| 2020/0039310 A1 | 2/2020 | Delorenzis et al. | |
| 2020/0254843 A1 | 8/2020 | Fulton et al. | |
| 2023/0069024 A1 * | 3/2023 | Delorenzis | B60G 11/27 |
| 2024/0399792 A1 * | 12/2024 | Yu | B60G 7/001 |

\* cited by examiner

DAMPING AIR SPRING FOR HEAVY-DUTY VEHICLE AXLE/SUSPENSION SYSTEMS

CROSS-REFERENCE TO RELATED APPLICATION

This application claims the benefit of U.S. Provisional Patent Application Ser. No. 63/237,825 filed on Aug. 27, 2021.

BACKGROUND

Technical Field

The present invention relates generally to the art of axle/suspension systems for heavy-duty vehicles. More particularly, the invention relates to axle/suspension systems for heavy-duty vehicles which utilize air springs to cushion the ride of the heavy-duty vehicle. More specifically, the invention is directed to a damping air spring for a heavy-duty vehicle axle/suspension system, in which the air spring has a relatively larger effective area, a piston with a relatively larger orifice size, and utilizes a smaller bellows-to-piston volume ratio to provide increased damping of the air spring at multiple critical frequencies, while reducing stiffness of the air spring.

Background Art

The use of air-ride beam-type axle/suspension systems in heavy-duty vehicles is known. For the purpose of clarity and convenience, reference is made to heavy-duty vehicles with the understanding that such reference includes trucks, tractor-trailers and semi-trailers, trailers, and the like. Although axle/suspension systems for heavy-duty vehicles can be found in widely varying structural forms, the various structures are generally similar in that each axle/suspension system typically includes a pair of suspension assemblies. The suspension assemblies are typically connected to a primary frame of the heavy-duty vehicle or a subframe supported by the primary frame. For those heavy-duty vehicles that support a subframe, the subframe can be non-movable or movable, the latter being commonly referred to as a slider box, slider subframe, slider undercarriage, secondary slider frame, or bogey.

Each suspension assembly of an axle/suspension system includes a longitudinally-extending elongated beam. The beam may extend rearwardly or frontwardly relative to the front of the heavy-duty vehicle, thus defining what are typically referred to as trailing- or leading-arm axle/suspension systems, respectively. However, for the purpose of conciseness and clarity, it is to be understood that the term trailing-arm as used in the instant application encompasses beams which extend either rearwardly or frontwardly with respect to the front end of the heavy-duty vehicle. Each beam typically is located adjacent to and below a respective one of a pair of spaced-apart, longitudinally-extending main members and one or more cross members that form the frame or subframe of the heavy-duty vehicle. For the purpose of clarity and conciseness, reference herein will be made to main members with the understanding that such reference includes main members of primary frames, movable subframes, and non-movable subframes. Each beam is pivotally connected at one of its ends to a hanger, which is attached to and depends from a respective one of the main members of the frame of the heavy-duty vehicle. An axle extends transversely between, and typically is connected to, the beams of the pair of suspension assemblies at a selected location from about the mid-point of each beam to the end of the beam opposite its pivotal connection to its respective hanger. A wheel is rotatably mounted on each end of the axle in a manner known in the art. An air spring, or other spring mechanism, is connected to, and extends between the beam end opposite the pivotal connection to the hanger and a respective one of the main members. A brake system and, optionally, one or more shock absorbers are also mounted on the axle/suspension system in a manner known in the art.

The axle/suspension systems of the heavy-duty vehicle act to cushion the ride, damp vibrations, and stabilize the heavy-duty vehicle during vehicle operation. More particularly, as the heavy-duty vehicle is traveling over the road, the wheels encounter road conditions that impart various forces, loads, and/or stresses, collectively referred to herein as forces, to the respective axle on which the wheels are mounted, and in turn, to the suspension assemblies that are connected to and support the axle. These forces include vertical forces caused by vertical movement of the wheels as they encounter certain road conditions, fore-aft forces caused by acceleration and deceleration of the heavy-duty vehicle, as well as certain road conditions, and side-load and torsional forces associated with transverse heavy-duty vehicle movement, such as turning and lane-change maneuvers.

In order to minimize the detrimental effect of these forces on the heavy-duty vehicle during operation, the axle/suspension system is designed to react and/or absorb at least some of these forces. In particular, the axle/suspension system is designed with structural characteristics to address these disparate forces. More particularly, the axle/suspension system is designed to have beams that are fairly stiff in order to minimize the amount of sway experienced by the heavy-duty vehicle and thus provide roll stability, as is known. However, it is also desirable for the axle/suspension system to be relatively flexible to assist in cushioning the heavy-duty vehicle from vertical impacts and provide the axle/suspension system with compliance to resist failure and increase durability. Moreover, it is desirable to damp the vibrations or oscillations that result from these forces. For heavy-duty vehicles, increased damping of the axle/suspension system is critical in the frequency ranges from about 0.8 Hz to about 2.0 Hz, body bounce mode, and from about 8.0 Hz to about 15 Hz, wheel hop mode. At these frequencies, the axle/suspension system is predisposed to move such that road inputs at these frequencies may result in a harmonic build-up of movement in the axle/suspension system that can potentially adversely affect the performance of the axle/suspension system, and thus the heavy-duty vehicle.

A key component of the axle/suspension system that cushions the ride of the heavy-duty vehicle from vertical impacts is the air spring. Prior art air springs without damping characteristics or non-damping air springs generally include three main components: a flexible bellows, a piston, and a bellows top plate. The bellows is typically formed from rubber or other flexible material, and is sealingly engaged with the bellows top plate and the top portion of the piston. The volume of pressurized air, or "air volume", that is contained within the air spring is a major factor in determining the spring rate, or stiffness, of the air spring. More specifically, this air volume is contained within the bellows and, in some cases, the piston of the air spring via unrestricted air flow between the piston and the bellows. The larger the air volume of the air spring, the lower the spring rate, or stiffness, of the air spring. A lower spring rate, or reduced stiffness, is generally more desirable in the heavy-duty vehicle industry because it decreases vibrations transmitted to the main members of the heavy-duty vehicle, allowing for softer ride characteristics.

The spring rate of prior art air springs may be adjusted by altering the effective area of the air spring, as is known. In particular, the spring rate of the prior art air spring is generally proportional to the effective area of the air spring. More particularly, the effective area of the prior art air spring is equivalent to the spring force, or load, divided by the internal pressure. The spring force and internal pressure of the prior art air spring vary continuously during operation of the heavy-duty vehicle such that the actual effective area of the prior art air spring can only be determined using empirical measurement, but may be estimated using the following equation:

$$A_e = \frac{0.9\pi}{16}(\text{Diameter of bellows} + \text{diameter of piston})^2$$

where $A_e$ is the estimated effective area of the air spring. From the above equation, it is known in the art that reducing the diameter of the piston or bellows can also reduce the effective area, thereby reducing the spring rate, or stiffness, which is desirable.

Prior art air springs without damping characteristics, while adequately cushioning the heavy-duty vehicle cargo and occupant(s) during operation, provide little if any damping characteristics to the axle/suspension system. As a result, damping at critical frequency ranges is typically provided by a pair of hydraulic shock absorbers, although a single shock absorber has also been utilized, as is known. However, these shock absorbers experience changes and limitations in their damping performance. In particular, shock absorbers typically experience changes in performance characteristics over time as they wear, causing changes in the ride and handling characteristics of the heavy-duty vehicle that, in turn, may cause additional wear of the tires and other components of the axle/suspension system over time. More particularly, these changes can potentially increase operational costs of the heavy-duty vehicle.

Moreover, the performance of the shock absorbers is typically optimized for a design load of the shock absorbers and does not vary based on payload. Thus, as payload is added or removed from the heavy-duty vehicle, the performance of the shock absorbers may potentially become non-optimal. More specifically, shock absorbers are typically designed for the heaviest expected payload of the heavy-duty vehicle such that the axle/suspension system will become overdamped for lighter loads, potentially increasing wear on the tires and other components of the axle/suspension system. In addition, shock absorbers are a service item of the axle/suspension system that require maintenance and/or replacement from time to time, resulting in increased maintenance and/or replacement costs of the axle/suspension system.

Shock absorbers also add varying degrees of complexity and weight to the axle/suspension system. In particular, the amount of cargo that a heavy-duty vehicle may carry is governed by local, state, and/or national road and bridge laws that limit the maximum load that a heavy-duty vehicle may carry as well as the maximum load that may be supported by individual axles of the heavy-duty vehicle. More particularly, because shock absorbers are relatively heavy, the shock absorbers add undesirable weight to the axle/suspension system, thereby reducing the amount of cargo that can be carried by the heavy-duty vehicle.

As a result, prior art air springs with damping characteristics have been developed and may be utilized in heavy-duty vehicle air-ride axle/suspension systems. Such prior art damping air springs are generally similar in structure to prior art non-damping air springs, but include a piston having a piston chamber. The piston generally has one or more openings extending through a piston top plate such that the openings are capable of providing restricted fluid communication between the bellows and piston chamber. The restricted fluid communication between the bellows and the piston chamber during heavy-duty vehicle operation provides damping to the axle/suspension system. More specifically, when the axle/suspension system experiences a jounce or rebound event, the bellows is compressed or expanded, respectively, causing the internal pressure of the bellows to increase or decrease, respectively. The change of pressure within the bellows creates a pressure differential between the bellows and the piston chamber that causes air to flow between the bellows and piston chamber through the opening(s) of the piston top plate, thereby causing damping to occur.

The separate volumes of air in the bellows and piston chamber of prior art damping air springs are major factors in determining the damping performance of the air spring. In particular, the performance of prior art damping air springs can be generally expressed as an amount of energy (in Joules), or "damping energy", dissipated during jounce and rebound events. It is generally more desirable in the heavy-duty vehicle industry for an air spring to have a greater damping energy because it provides a more controlled ride for the heavy-duty vehicle during operation. Damping energy is generally greater when prior art damping air springs utilize a smaller bellows volume and a greater piston volume, resulting in a smaller bellows-to-piston volume ratio.

Prior art air springs with damping characteristics, while providing adequate damping to the axle/suspension system of the heavy-duty vehicle, have potential disadvantages, drawbacks, and limitations. For example, as described above, heavy-duty vehicles generally have multiple frequency ranges where increased damping of the axle/suspension system is critical, such as from about 0.8 Hz to about 2.0 Hz, body bounce mode, and from about 8.0 Hz to about 15 Hz, wheel hop mode. However, prior art damping air springs generally only provide peak damping characteristics within a single critical frequency range. More specifically, prior art damping air springs only provide acceptable damping in the critical frequency range from about 0.8 Hz to about 2.0 Hz, body bounce mode.

Prior art air springs with damping characteristics may provide more damping by reducing the bellows-to-piston volume ratio, as is known. However, this volume ratio reduction can increase the spring rate of the air spring so that ride characteristics degrade and become unacceptable.

Alternatively, prior at air springs with damping characteristics may utilize a reduced orifice diameter for the openings between the piston chamber and the bellows in order to provide increased damping and, as a result, achieve better acceptable damping in the critical frequency range from about 0.8 Hz to about 2.0 Hz, body bounce mode. However, the reduction of orifice diameter unacceptably results in decreased damping in the critical frequency range from about 8.0 Hz to about 15 Hz, wheel hop mode.

In addition, prior art air springs with and without damping characteristics both utilize relatively reduced or small effective areas in order to provide a reduced or softer spring rate. However, such reduced effective area unexpectedly prevents the air spring with damping characteristics from providing increased and acceptable damping in the critical frequency range from about 8.0 Hz to about 15 Hz, wheel hop mode.

Therefore, it is desirable to have an air spring with damping features that has an increased effective area and a piston chamber with relatively larger orifices that utilizes a smaller bellows-to-piston volume ratio to provide increased damping over both the body bounce mode and wheel hop mode critical frequency ranges, while also providing reduced spring rate and stiffness allowing for softer ride characteristics. By providing an air spring for heavy-duty vehicles having increased damping performance across both critical frequency ranges, the shock absorber of the axle/suspension system can be eliminated or its size reduced, reducing complexity, saving weight and cost, and allowing the heavy-duty vehicle to haul more cargo.

BRIEF SUMMARY OF THE INVENTION

An objective of the present invention is to provide an air spring with improved damping characteristics.

Another objective of the present invention is to provide an air spring that provides improved damping characteristics at multiple critical frequency ranges.

Yet another objective of the present invention is to provide an air spring that eliminates or reduces the need for shock absorbers to provide damping at critical frequencies.

These objectives and others are achieved by the damping air spring for heavy-duty vehicle axle/suspension systems of the present invention, which includes: a bellows including a bellows chamber; a piston including a piston chamber, the bellows chamber being operatively connected to the piston chamber; at least one opening disposed between the bellows chamber and the piston chamber for restricted fluid communication between the bellows chamber and the piston chamber; and wherein a ratio of a cross-sectional area of the at least one opening in square inches to a volume of the piston chamber in cubic inches to a volume of the bellows chamber in cubic inches to a mean effective area of the air spring in square inches, is from about 1:600:1200:120 to about 1:14100:23500:1200.

These objectives and others are also achieved by the damping air spring for heavy-duty vehicle axle/suspension systems of the present invention, which includes: a bellows including a bellows chamber; a piston including a piston chamber, the bellows chamber being operatively connected to the piston chamber; at least one opening disposed between the bellows chamber and the piston chamber for restricted fluid communication between the bellows chamber and the piston chamber; and wherein a ratio of a cross-sectional area of the at least one opening in square inches to a volume of the piston chamber in cubic inches to a volume of the bellows chamber in cubic inches to a unitless ratio of the volume of the bellows chamber to the volume of the piston chamber is from about 1:600:1200: 0.001 to about 1:14100:23500:5.0.

BRIEF DESCRIPTION OF THE SEVERAL VIEWS OF THE DRAWINGS

The exemplary embodiment of the present invention, illustrative of the best mode in which Applicant has contemplated applying the principles, is set forth in the following description and shown in the drawings.

Similar reference characters refer to similar parts throughout.

DETAILED DESCRIPTION OF THE INVENTION

Figure 1:
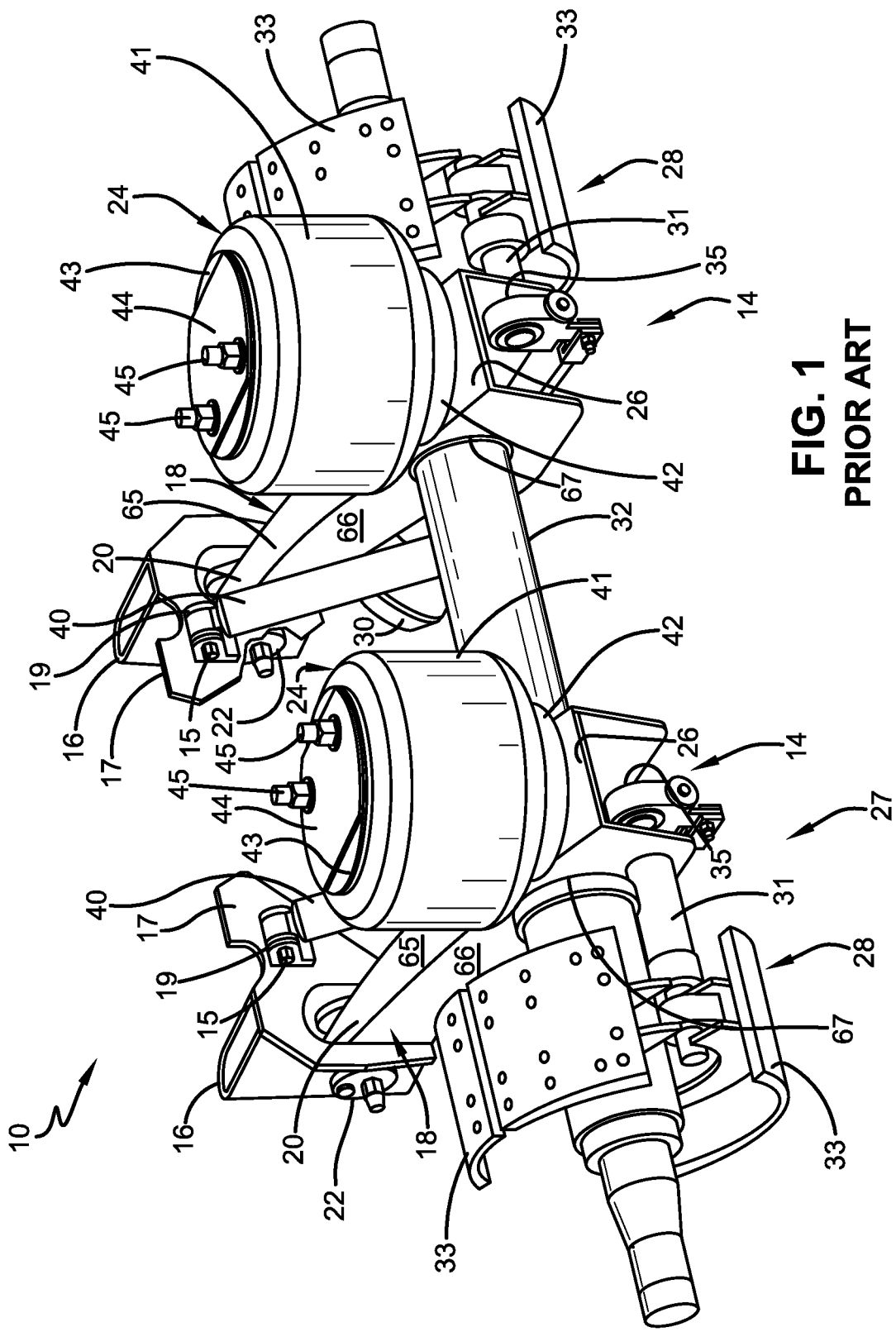
FIG. 1 is a top rear perspective view of a trailing arm axle/suspension system incorporating a pair of prior art air springs without damping characteristics and a pair of shock absorbers, showing each one of the prior art air springs and each one of the shock absorbers mounted on a respective one of the suspension assemblies of the axle/suspension system.

In order to better understand the environment in which the damping air spring for heavy-duty vehicle axle/suspension systems of the present invention is utilized, a trailing-arm beam-type air-ride axle/suspension system that incorporates a pair of prior art non-damping air springs 24 is shown in FIG. 1 and is indicated generally at 10. Axle/suspension system 10 is typically mounted on a pair of longitudinally-extending spaced-apart main members (not shown) of a frame (not shown) of a heavy-duty vehicle (not shown). Axle/suspension system 10 generally includes a pair of mirror-image suspension assemblies 14. Inasmuch as suspension assemblies 14 are mirror images of one another, for the purpose of conciseness and clarity, only one of the suspension assemblies will be described in detail below.

Suspension assembly 14 includes a trailing-arm beam 18 formed having a generally upside-down integrally formed U-shape structure with a pair of sidewalls 66 and a top wall 65, with the open portion of the beam facing generally downwardly. A bottom plate (not shown) extends between and is attached to the lowermost ends of sidewalls 66 by suitable means, such as welding. Beam 18 includes a front end 20 having a bushing assembly 22, as is known, to facilitate pivotal connection of the beam to a hanger 16, which in turn is attached to a respective main member of the frame of the heavy-duty vehicle. Beam 18 also includes a rear end 26. A transversely-extending axle 32 is disposed through openings 67 formed in sidewalls 66 of beam 18 near rear end 26 of the beam and is rigidly attached thereto using any suitable means, such as welding.

Prior art non-damping air spring 24 is mounted on rear end 26 of beam 18 of suspension assembly 14 and extends between rear end 26 of the beam and the main member (not shown) of the frame of the heavy-duty vehicle. Prior art air spring 24 generally includes a bellows 41 and a piston 42. The top portion of bellows 41 is sealingly engaged with a bellows top plate 43. An air spring mounting plate 44 is mounted on bellows top plate 43 by fasteners 45, which are also used to mount the top portion of air spring 24 to the main member of the frame of the heavy-duty vehicle. Piston 42 is generally cylindrically shaped and has a generally flat bottom plate (not shown) and top plate (not shown). The bottom portion of bellows 41 is sealingly engaged with the top plate of piston 42. The bottom plate of piston 42 rests on and is attached to top wall 65 of beam 18 at rear end 26 of the beam, as is known. Typically, the top plate of piston 42 is formed without openings so that there is no fluid communication between the piston and bellows 41. As a result, piston 42 does not generally contribute any appreciable volume to air spring 24. Alternatively, the top plate of piston 42 may be formed with large openings to allow unrestricted fluid communication between bellows 41 and the piston in order to increase the volume of prior art air spring 24 and lower the spring rate of the air spring, as is known.

Suspension assembly 14 also includes a shock absorber 40. The top end of shock absorber 40 is mounted on an inboardly extending wing 17 of hanger 16 via a mounting bracket 19 and a fastener 15, as is known. The bottom end of shock absorber 40 is mounted to beam 18 in a manner known in the art. For completeness, axle/suspension system 10 is shown with a pair of brake assemblies 28 of a drum brake system 27 incorporated into the axle/suspension system to provide braking to the heavy-duty vehicle in a manner known in the art. Each brake assembly 28 includes a brake chamber 30, a cam shaft assembly 31, a slack adjuster 35, and a pair of brake shoes 33 mounted on a component of a respective suspension assembly 14 or outboard end of axle 32.

Axle/suspension system 10 is designed to react and/or absorb forces that act on the heavy-duty vehicle during operation. In particular, it is desirable for axle/suspension system 10 to be rigid or stiff in order to resist roll forces and thus provide roll stability for the heavy-duty vehicle. This is typically accomplished via beam 18, which is rigid and also rigidly attached to axle 32. It is also desirable, however, for axle/suspension system 10 to be flexible to assist in cushioning the heavy-duty vehicle from vertical impacts and to provide the axle/suspension system with compliance to resist failure. Such flexibility is typically achieved through the pivotal connection of beam 18 to hanger 16 with bushing assembly 22. In addition, prior art non-damping air spring 24 cushions the ride for cargo and passengers.

Prior art non-damping air spring 24, while providing adequate cushioning to the heavy-duty vehicle cargo and/or occupant(s) during operation, has potential disadvantages, drawbacks, and limitations. For example, prior art air spring 24 has very limited or no damping capabilities. Instead, suspension assembly 14 relies on shock absorber 40 to provide damping to axle/suspension system 10. However, shock absorber 40 is relatively heavy, adding weight to axle/suspension system 10, and thus the heavy-duty vehicle, thereby reducing the amount of cargo that can be carried by the vehicle. Shock absorber 40 is also a service item of axle/suspension system 10 that will require maintenance and/or replacement from time to time, increasing complexity, maintenance, and cost.

Figure 2:
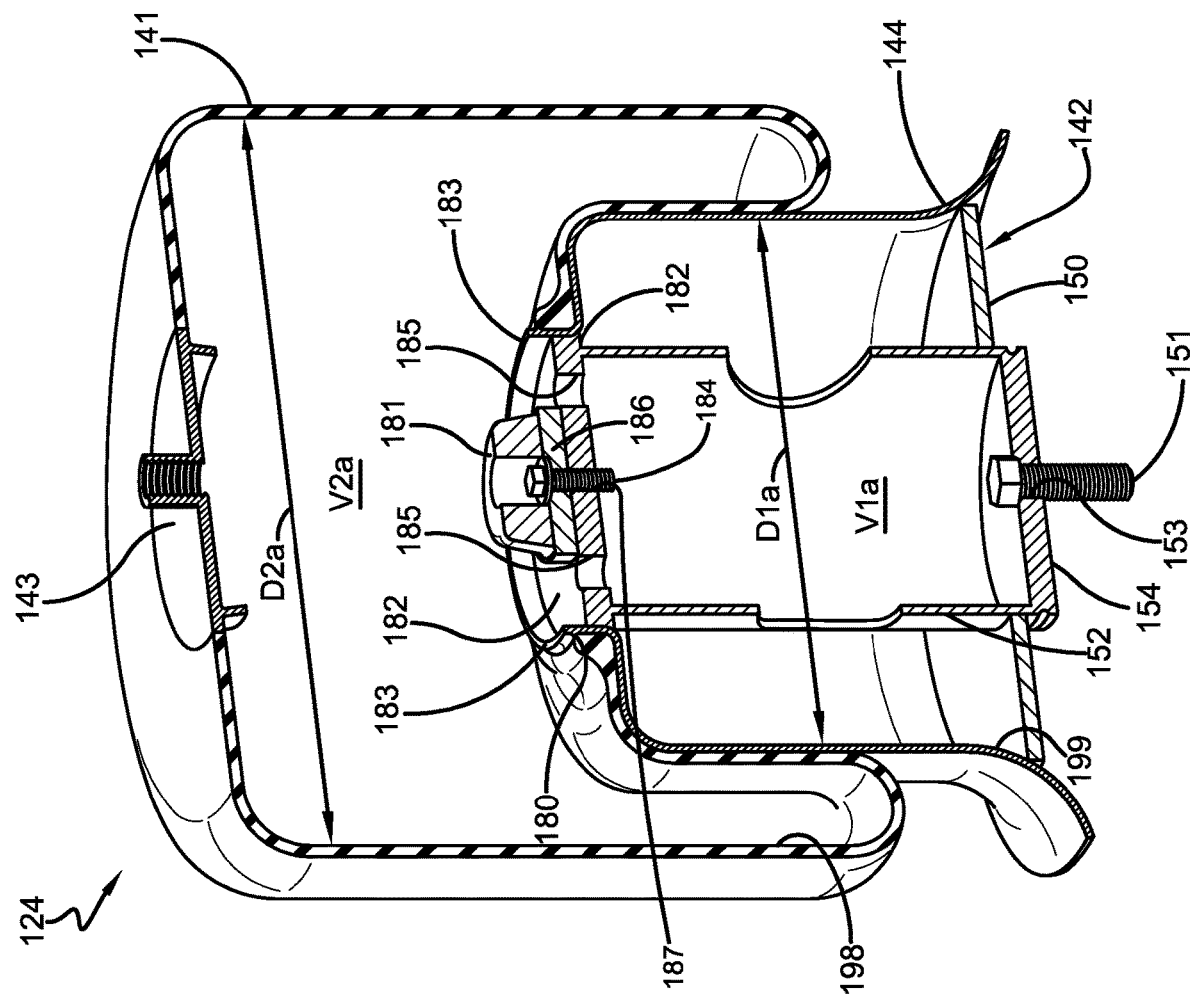
FIG. 2 is a perspective view, in cross-section, of a prior art air spring with damping characteristics.

In order to further understand the damping air spring for heavy-duty vehicle axle/suspension systems of the present invention, a prior art damping air spring for heavy-duty vehicle axle/suspension systems, such as may be used in axle/suspension system 10, is shown in FIG. 2 and is indicated generally at 124, and will now be described. Prior art damping air spring 124 generally includes a bellows 141 and a piston 142. The top end of bellows 141 is sealingly engaged with a bellows top plate 143 in a manner known in the art. An air spring mounting plate (not shown) is mounted on the top surface of bellows top plate 143 by fasteners (not shown) which are also used to mount the top end of air spring 124 to a respective one of the main members (not shown) of the frame (not shown) of the heavy-duty vehicle (not shown). Alternatively, bellows top plate 143 may be attached directly to a respective one of the main members of the frame of the heavy-duty vehicle. Piston 142 is generally cylindrical-shaped and includes a continuous generally stepped sidewall 144 attached to a generally flat bottom plate 150. Piston 142 includes a top plate 182 that is integrally formed with or otherwise rigidly attached to sidewall 144 of the piston. Piston 142 further includes a generally cylindrical-shaped central hub 152, which extends upwardly from bottom plate 150 to top plate 182. Central hub 152 includes a bottom plate 154 formed with a central opening 153. A fastener 151 is disposed through opening 153 and is utilized to attach piston 142 to top wall 65 (FIG. 1) of beam 18 (FIG. 1) at rear end 26 (FIG. 1) of the beam.

Top plate 182 of piston 142 is formed with a circular upwardly-extending protrusion 183 having a lip 180 around its circumference. Lip 180 cooperates with the lowermost end of bellows 141 to form an air tight seal between the bellows and the lip in a manner known in the art. A bumper 181 is rigidly attached to a bumper mounting plate 186, which, in turn, is mounted on top plate 182 of piston 142 by a fastener 184 that engages an opening 187 formed in the top plate. Bumper 181 extends upwardly from the top surface of bumper mounting plate 186 and provides a cushion between top plate 182 of piston 142 and bellows top plate 143 in order to prevent the top plates from contacting and potentially damaging one another during operation of the heavy-duty vehicle.

Top plate 182, sidewall 144, bottom plate 150, and bottom plate 154 of piston 142 define a piston chamber 199 having a diameter D1a and an internal volume V1a. Bellows 141, bellows top plate 143, and top plate 182 of piston 142 define a bellows chamber 198 having a diameter D2a and an internal volume V2a at standard static ride height. Diameter D1a of piston chamber 199 and diameter D2a of bellows chamber 198 provide prior art damping air spring 124 with an effective area in the range of from about 60 square inches (in.$^2$) to about 70 square inches (in.$^2$).

Top plate 182 of piston 142 is formed with a pair of openings 185, which provide restricted fluid communication between internal volume V1a of piston chamber 199 and internal volume V2a of bellows chamber 198. More particularly, openings 185 allow fluid or air to pass between piston chamber 199 and bellows chamber 198 during operation of the heavy-duty vehicle. Openings 185 are circular and have a cross-sectional area in the range of from about 0.039 square inches (in.$^2$) to about 0.13 square inches (in.$^2$). The ratio of the cross-sectional area of openings 185 measured in square inches (in.$^2$) to the volume of piston chamber 199 measured in cubic inches (in.$^3$) to the volume of bellows chamber 198 measured in cubic inches (in.$^3$) is in the range of ratios of from about 1:600:1200 to about 1:14100:23500. This is an inclusive range of ratios that may be alternatively expressed as 1:600-14100:1200-23500, including any combination of ratios in between, and, for example, would necessarily include the following ratios: 1:600:23500 and 1:14100:1200.

During operation of the heavy-duty vehicle, when axle 32 of axle/suspension system 10 experiences a jounce event, such as when the wheels of the heavy-duty vehicle encounter a curb or a raised bump in the road, the axle moves vertically upwardly toward the main members of the frame of the heavy-duty vehicle. As a result, bellows 141 is compressed by axle/suspension system 10 as the wheels of the heavy-duty vehicle travel over the curb or the raised bump in the road. The compression of bellows 141 causes the internal pressure of bellows chamber 198 to increase, creating a pressure differential between the bellows chamber and piston chamber 199. This pressure differential causes air to flow from bellows chamber 198 through openings 185 into piston chamber 199, reducing the pressure differential and causing damping to occur. Air continues to flow back and forth between bellows chamber 198 and piston chamber 199 through openings 185 until pressures within the piston chamber and the bellows chamber have equalized.

Conversely, when axle 32 of axle/suspension system 10 experiences a rebound event, such as when the wheels of the heavy-duty vehicle encounter a large hole or depression in the road, the axle moves vertically downwardly away from the main members of the frame of the heavy-duty vehicle. As a result, bellows 141 is expanded by axle/suspension system 10 as the wheels of the heavy-duty vehicle travel into the hole or depression in the road. The expansion of bellows 141 causes the internal pressure of bellows chamber 198 to decrease, creating a pressure differential between the bellows chamber and piston chamber 199. This pressure differential causes air to flow from piston chamber 199 through openings 185 into bellows chamber 198, reducing the pressure differential and causing damping to occur. Air continues to flow back and forth between bellows chamber 198 and piston chamber 199 through openings 185 until pressures within the piston chamber and the bellows chamber have equalized.

The level of damping, as well as the frequency at which the highest level of damping occurs, is tuned by adjusting the relative sizes of internal volume V1a of piston chamber 199, internal volume V2a of bellows chamber 198, and/or openings 185. For example, a relatively smaller internal volume V2a of bellows chamber 198, will generally produce a higher level of damping, as the pressure change within the bellows chamber will be higher for a given event such that a higher-pressure differential will result in more flow through openings 185, thereby resulting in increased damping. In addition, a relatively larger internal volume V1a of piston chamber 199 will also generally produce a higher level of damping because more air will need to flow through openings 185 before the piston chamber and bellows chamber 198 equalize, resulting in increased damping. Moreover, changing the relative cross-sectional area, shape, number, or even length of openings 185 may, in turn, affect the time it takes for the pressures in piston chamber 199 and bellows chamber 198 to equalize. Therefore, the cross-sectional area of openings 185 can be altered to both vary the level of damping and the frequency at which the highest level of damping occurs.

Figure 4:
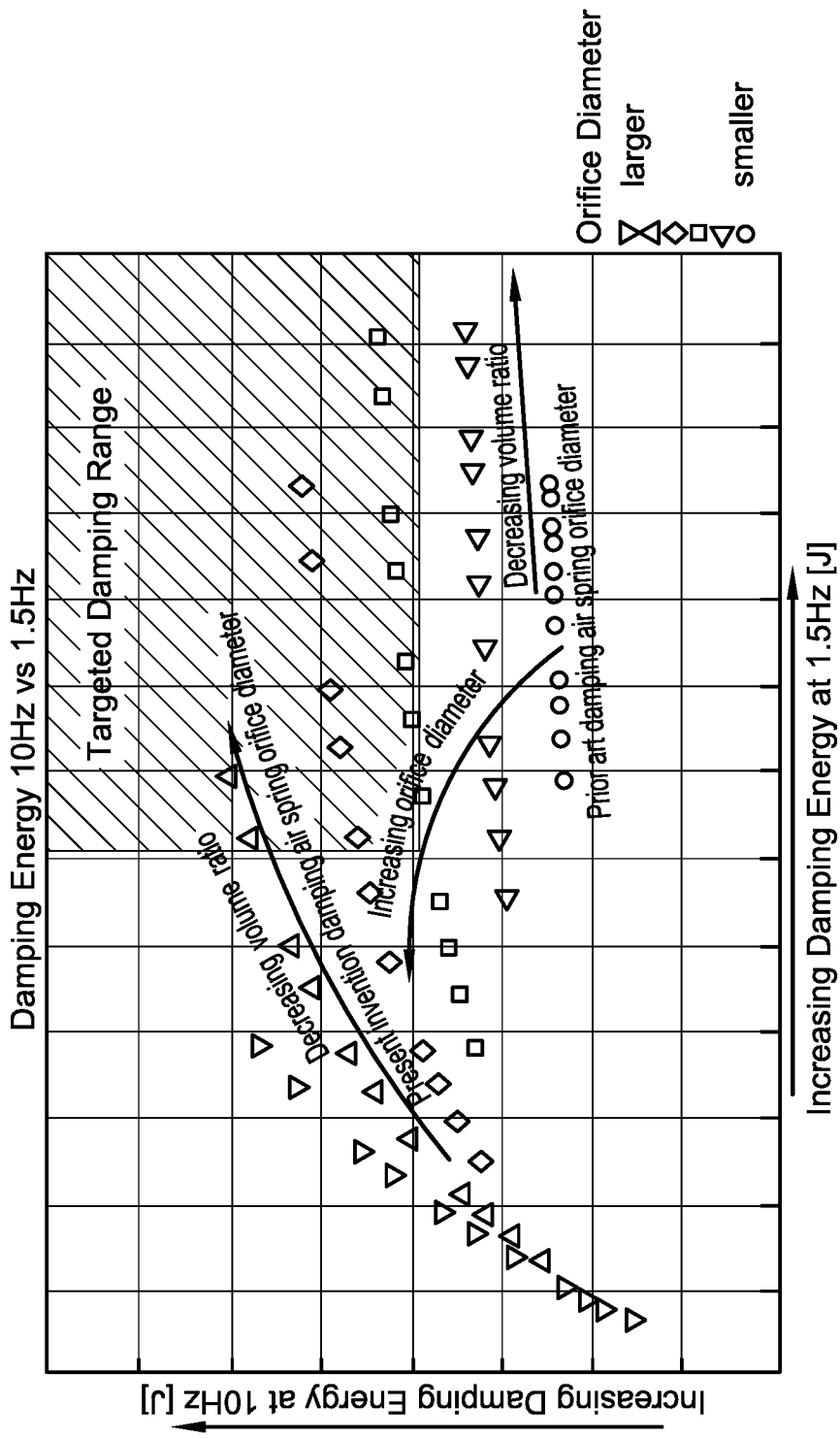
FIG. 4 is a graph of experimental data obtained from the exemplary embodiment damping air spring shown in FIG. 3, showing damping energy at 10 Hz versus damping energy at 1.5 Hz for decreasing bellows-to-piston volume ratios and increasing orifice sizes, including prior art air spring orifice sizes.

Prior art damping air spring 124, while providing adequate damping to the axle/suspension system of the heavy-duty vehicle, has potential disadvantages, drawbacks, and limitations. For example, heavy-duty vehicles generally have multiple frequency ranges where increased damping of the axle/suspension system(s) is critical, such as from about 0.8 Hz to about 2.0 Hz, body bounce mode, and from about 8.0 Hz to about 15 Hz, wheel hop mode. However, prior art damping air spring 124 generally only provides peak damping characteristics for a single critical frequency range. In particular, as shown in FIG. 4, regardless of the bellows-to-piston volume ratio and effective area utilized, openings 185 of prior art damping air spring 124 unexpectedly only provide the targeted damping in the critical frequency range from about 0.8 Hz to about 2.0 Hz, body bounce mode, but not in the higher critical frequency range from about 8.0 Hz to about 15 Hz, wheel hop mode. Thus, the size of openings 185 of prior art damping air spring 124 prevent the air spring from providing the targeted damping in the critical frequency range from about 8.0 Hz to about 15 Hz, wheel hop mode.

Figure 5:
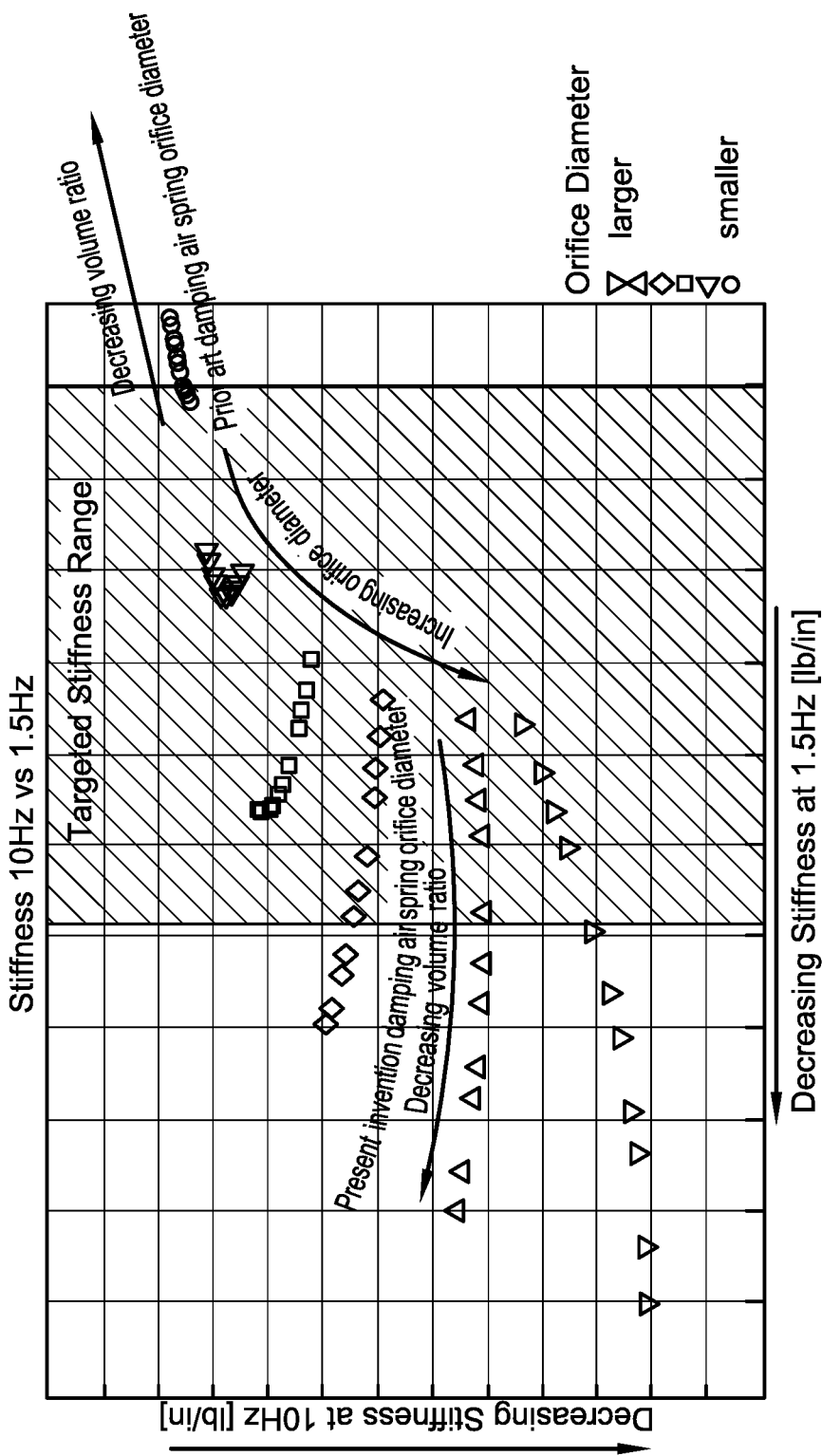
FIG. 5 is a graph of experimental data obtained from the exemplary embodiment damping air spring shown in FIG. 3, showing stiffness at 10 Hz versus stiffness at 1.5 Hz for decreasing bellows-to-piston volume ratios and increasing orifice sizes, including prior art air spring orifice sizes.

As shown in FIG. 5, as the volume ratio of prior art damping air spring 124 with smaller openings 185 is decreased to attempt to improve damping, the stiffness of the air spring at body bounce mode (from about 0.8 Hz to about 2.0 Hz) also increases, causing the ride characteristics to degrade. Thus, the size of openings 185 of prior art damping air spring 124 prevent the air spring from providing targeted stiffness while at the same time increasing damping. The damping air spring for heavy-duty vehicle axle/suspension systems of the present invention overcomes the disadvantages, drawbacks, and limitations of prior art air springs, such as prior art air springs 24 and 124, and will now be described.

Figure 3:
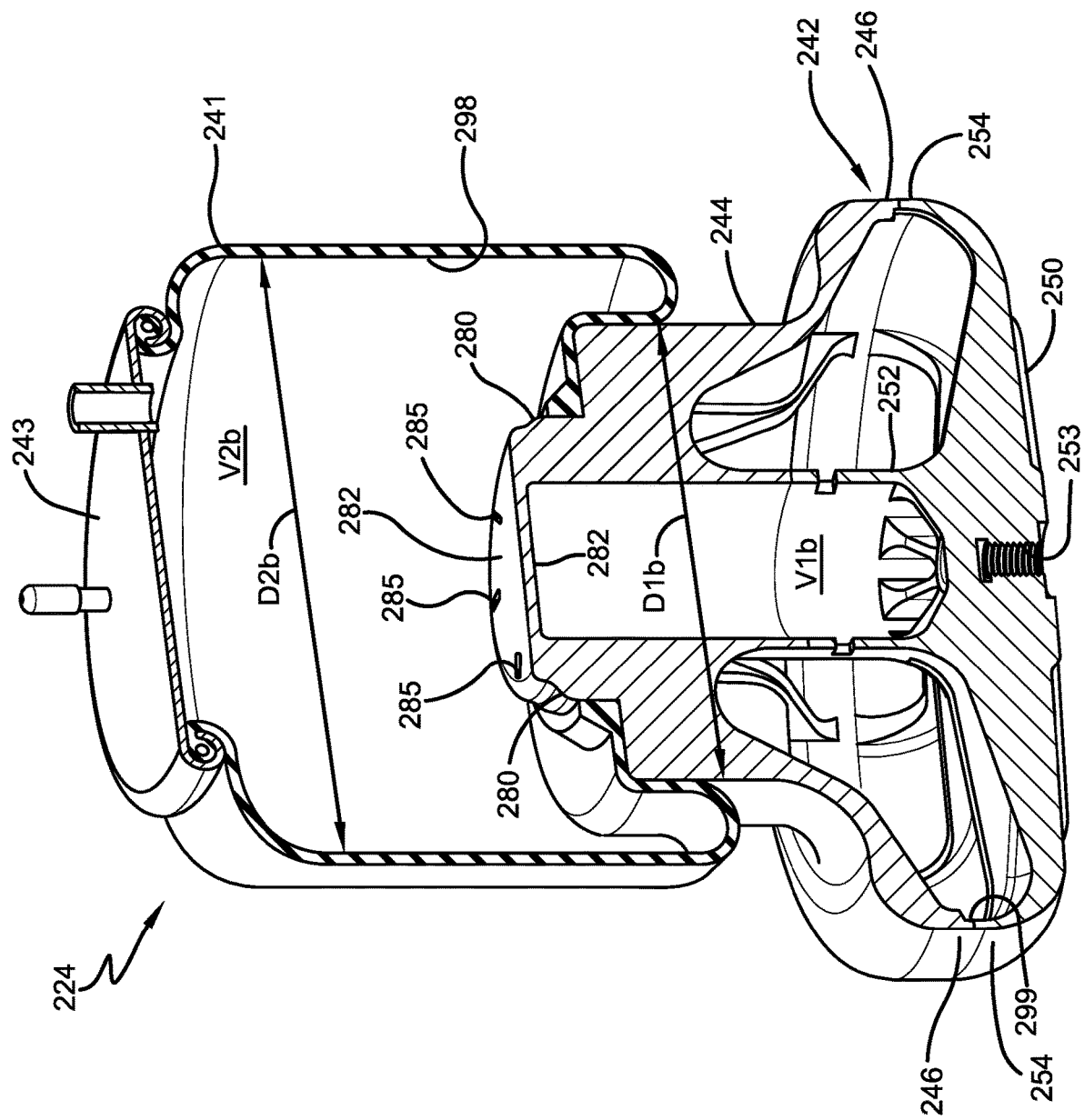
FIG. 3 is a perspective view, in cross-section, of an exemplary embodiment damping air spring for heavy-duty vehicle axle/suspension systems, according to the present invention, showing openings formed in a piston top plate between and communicating with the piston chamber and the bellows chamber.

An exemplary embodiment damping air spring for heavy-duty vehicle axle/suspension systems of the present invention is shown in FIG. 3 and is indicated generally at 224. For purposes of this disclosure, exemplary embodiment damping air spring 224 is described as being incorporated into axle/suspension system 10 (FIG. 1), but may be incorporated into other suitable heavy-duty vehicle air-ride axle/suspension systems without affecting the overall concept or operation of the present invention. Exemplary embodiment damping air spring 224 generally includes a bellows 241 and a piston 242. The top end of bellows 241 is sealingly engaged with a bellows top plate 243 by suitable means known in the art. An air spring mounting plate (not shown) may be mounted on the top surface of bellows top plate 243 by fasteners (not shown), which may also be used to attach exemplary embodiment damping air spring 224 to a respective one of the main members (not shown) of the frame (not shown) of the heavy-duty vehicle (not shown). Alternatively, bellows top plate 243 could also be mounted directly on a respective one of the main members of the frame of the heavy-duty vehicle.

Piston 242 is generally cylindrical-shaped and includes a stepped sidewall 244 that is integrally formed with or otherwise rigidly attached to a top plate 282 via suitable means known in the art. Sidewall 244 includes a downward-extending flange 246. Piston 242 further includes a bottom portion 250 with an upwardly extending flange 254 that is integrally formed with or otherwise rigidly attached to flange 246 of sidewall 244 via suitable means, such as friction welding. Piston 242 includes a generally cylindrical-shaped central hub 252 which extends upwardly from bottom portion 250 to top plate 282. Central hub 252 is formed with a central opening 253, which extends through bottom portion 250 of piston 242. A fastener (not shown) is disposed through opening 253 and is utilized to attach piston 242 to top wall 65 (FIG. 1) of beam 18 (FIG. 1) at rear end 26 (FIG. 1) of the beam. Top plate 282 of piston 242 is formed with a lip 280 around its circumference. Lip 280 cooperates with the lowermost end of bellows 241 to form an air tight seal between the bellows and the lip in a manner known in the art. A bumper (not shown) may be rigidly attached to top plate 282 of piston 242 to provide a cushion between the top plate of the piston and bellows top plate 243 to prevent the top plates from contacting and potentially damaging one another during operation of the heavy-duty vehicle.

In accordance with an important aspect of the present invention, top plate 282, sidewall 244, and bottom plate 250 of piston 242 define a piston chamber 299 having a diameter D1$b$ and an internal volume V$b$. Internal volume V1$b$ of piston chamber 299 is preferably from about 450 cubic inches (in.$^3$) to about 6500 cubic inches (in.$^3$). Bellows 241, bellows top plate 243, and piston top plate 282 define a bellows chamber 298 having a diameter D2$b$ and an internal volume V2$b$ at standard static ride height. Internal volume V2$b$ of bellows chamber 298 is preferably from about 305 cubic inches (in.$^3$) to about 915 cubic inches (in.$^3$). The bellows chamber volume V2$b$ and piston chamber volume V1$b$ are selected in order to provide a relatively smaller bellows-to-piston volume ratio as compared to prior art damping air springs, such as prior art damping air spring 124. More particularly, the ratio of bellows chamber volume V2$b$ to piston chamber volume V1$b$ may be less than 1.0, and more preferably less than 0.5. Diameters D1$b$ and D2$b$ of piston chamber and bellows chamber, respectively, are selected in order to provide exemplary embodiment damping air spring 224 with a relatively larger effective area of from about 75 square inches (in.$^2$) to about 130 square inches (in.$^2$), with a preferred mean effective area of from about 100 square inches (in.$^2$) to about 110 square inches (in.$^2$). As a result, exemplary embodiment damping air spring 224 provides improved damping at the critical frequency range of from about 8.0 Hz to about 15 Hz, wheel hop mode.

In accordance with another important aspect of the present invention, piston top plate 282 is formed with a plurality of openings 285, which allow restricted fluid communication between internal volume V1$b$ of piston chamber 299 and internal volume V2$b$ of bellows chamber 298. More particularly, openings 285 allow fluid or air to pass between piston chamber 299 and bellows chamber 298 during operation of the heavy-duty vehicle. Openings 285 are generally stadium shaped, but may be any other suitable shape, such as circular, ovoid, polygonal, etc., without affecting the overall concept or operation of the present invention. Openings 285 are generally distributed circumferentially about top plate 282 of piston 242 such that the openings evenly cover the surface of the top plate, but may be arranged in any other suitable manner without affecting the overall concept or operation of the present invention. The size of openings 285 may be adjusted to increase damping at a second critical frequency range of from about 8.0 Hz to about 15 Hz, wheel hop mode. More particularly, the total cross-sectional area of openings 285 is relatively larger than the total cross-sectional area of openings 185 of prior art damping air spring 124 and may have a total cross-sectional area in the range of from about 0.14 square inches (in.$^2$) to about 0.5 square inches (in.$^2$), more preferably from about 0.24 square inches (in.$^2$) to about 0.5 square inches (in.$^2$). It is contemplated that the ratio of the cross-sectional area of openings 285 measured in square inches (in.$^2$) to the internal volume V1$b$ of piston chamber 299 measured in cubic inches (in.$^3$) to the internal volume V2$b$ of bellows chamber 298 measured in cubic inches (in.$^3$) to the effective area of exemplary embodiment damping air spring 224 measured in square inches (in.$^2$) is in the range of ratios of from about 1:600:1200:120 to about 1:14100:23500:1200. This is an inclusive range of ratios that may be alternatively expressed as 1:600-14100:1200-23500:120-1200, including any combination of ratios in between, and, for example, would necessarily include the following ratios: 1:600:23500:1200 and 1:14100:1200:120.

It is also contemplated that the ratio of the cross-sectional area of openings 285 measured in square inches (in.$^2$) to the internal volume V1$b$ of piston chamber 299 measured in cubic inches (in.$^3$) to the internal volume V2$b$ of bellows chamber 298 measured in cubic inches (in.$^3$) to the unitless ratio of the volume of the bellows chamber to the volume of the piston chamber is from about 1:600:1200:0.001 to about 1:14100:23500:5.0. This is an inclusive range of ratios that may be alternatively expressed as 1:600-14100:1200-23500: 0.001-5.0, including any combination of ratios in between.

During operation of the heavy-duty vehicle, when axle 32 of axle/suspension system 10 experiences a jounce event, such as when the wheels of the heavy-duty vehicle encounter a curb or a raised bump in the road, the axle moves vertically upwardly toward the main members of the frame of the heavy-duty vehicle. As a result, bellows 241 is compressed by axle/suspension system 10 as the wheels of the heavy-duty vehicle travel over the curb or the raised bump in the road. The compression of bellows 241 causes the internal pressure of bellows chamber 298 to increase, creating a pressure differential between the bellows chamber and piston chamber 299. This pressure differential causes air to flow from bellows chamber 298 through openings 285 into piston chamber 299, causing damping to occur. Air continues to flow back and forth between bellows chamber 298 and piston chamber 299 through openings 285 until pressures within the piston chamber and bellows chamber have equalized.

Conversely, when axle 32 of axle/suspension system 10 experiences a rebound event, such as when the wheels of the heavy-duty vehicle encounter a large hole or depression in the road, the axle moves vertically downwardly away from the main members of the frame of the heavy-duty vehicle. As a result, bellows 241 is expanded by axle/suspension system 10 as the wheels of the heavy-duty vehicle travel into the hole or depression in the road. The expansion of bellows 241 causes the internal pressure of bellows chamber 298 to decrease, creating a pressure differential between the bellows chamber and piston chamber 299. This pressure differential causes air to flow out of piston chamber 299 through openings 285 into bellows chamber 298, causing damping to occur. Air continues to flow back and forth between piston chamber 299 and bellows chamber 298 through openings 285 until pressures within the piston chamber and the bellows chamber have equalized.

Thus, exemplary embodiment damping air spring for heavy-duty vehicle axle/suspension systems 224, according to the present invention, overcomes the problems associated with prior art air springs, such as prior art air springs 24 and 124, by providing an air spring that has improved damping in both critical frequency ranges. Exemplary embodiment damping air spring 224 includes a relatively smaller bellows-to-piston volume ratio, increasing damping energy in the critical frequency ranges from about 0.8 Hz to about 2.0 Hz, body bounce mode, and from about 8.0 Hz to about 15 Hz, wheel hop mode. Exemplary embodiment damping air spring 224 also provides top plate 282 of piston 242 with openings 285 having a relatively larger cross-sectional area as compared to prior art damping air springs, such as prior art air spring 124, that also further increases damping in the wheel hop mode critical frequency range (from about 8.0 Hz to about 15 Hz). In addition, exemplary embodiment damping air spring 224 also provides piston 242 and bellows 241 with respective diameters D1$b$ and D2$b$ that provide the air spring with a larger effective area, unexpectedly increasing damping energy in the wheel hop mode critical frequency range.

The combination of smaller bellows-to-piston volume ratio, increased size of openings 285, and larger effective area of damping air spring for heavy-duty vehicle axle/suspension systems 224 of the present invention, allows for a large increase in damping energy in the critical frequency range from about 8.0 Hz to about 15 Hz, wheel hop mode, thus allowing damping in both critical frequency ranges to increase to the targeted level, as shown in FIG. 4, without the use of shock absorber 40 of axle/suspension system 10, such that the shock absorber can be eliminated or reduced in size, thereby reducing complexity, weight, and cost and increasing the amount of cargo the heavy-duty vehicle can carry.

Furthermore, the combination of smaller bellows-to-piston volume ratio and increased size of openings 285 allows for a decrease in spring rate, or stiffness of damping air spring for heavy-duty vehicle axle/suspension systems 224 of the present invention, notwithstanding the increase in effective area, as shown in FIG. 5.

Note that the effect on FIG. 4 and FIG. 5 of increasing effective area is to move the data up and to the right on both graphs. The reduction in stiffness that results from increasing the size of openings 285 in the damping air spring for heavy-duty vehicle axle/suspension systems of the present invention counteracts the increase in stiffness that would have occurred by decreasing the volume ratio of prior art damping air spring 124. This result allows exemplary embodiment damping air spring for heavy-duty vehicle axle/suspension systems 224, according to the present invention, to provide improved damping without causing degraded ride characteristics due to increased stiffness.

It is contemplated that exemplary embodiment damping air spring 224 could be utilized on any heavy-duty vehicle, including buses, trucks, tractor-trailers or semi-trailers, trailers, and the like, having one or more than one axle without changing the overall concept or operation of the present invention. It is also contemplated that exemplary embodiment damping air spring 224 could be utilized on any heavy-duty vehicle having a frame or subframe, whether moveable or non-movable, without changing the overall concept or operation of the present invention. It is further contemplated that exemplary embodiment damping air spring 224 could be utilized on all types of air-ride beam-type axle/suspension system designs, such as overslung/top-mount, underslung/bottom-mount, spring-beam, non-torque reactive, independent, and 4-bag axle/suspension systems, including axle/suspension systems using U-bolts, U-bolt brackets/axle seats, and the like, or other types of suspensions without changing the overall concept or operation of the present invention. It is even contemplated that exemplary embodiment damping air spring 224 could be utilized in combination with shock absorbers without changing the overall concept or operation of the present invention.

It is contemplated that exemplary embodiment damping air spring 224 could be formed from any suitable material or combination of materials, including composites, metal, and the like, without changing the overall concept or operation of the present invention. It is also contemplated that openings 285 of exemplary embodiment damping air spring 224 may have any suitable shape and may be formed in any suitable location on top plate 282 of piston 242, including locations other than those shown and described, without changing the overall concept or operation of the present invention. It is yet further contemplated that the concepts shown in exemplary embodiment damping air spring 224 could be utilized individually or in any combination in any type of air spring or structure utilized in conjunction with heavy-duty vehicles to provide damping, for example, a flexible bellows with a bellows chamber of a suspension assembly that is in restricted fluid communication with a structure (not shown) removed from or remote from the bellows chamber, such as a tank, without changing the overall concept or operation of the present invention. It is yet further contemplated that the internal volume V2$b$ of bellows chamber 298, the internal volume V1$b$ of piston chamber 299, and/or the cross-sectional area of openings 285 could be dynamically altered during heavy-duty vehicle operation. More specifically, internal volume V2$b$, internal volume V1$b$, and/or the cross-sectional area of openings 285 of exemplary embodiment damping air spring 224 could be altered during operation of the heavy-duty vehicle based upon the load carried by the heavy-duty vehicle in order to increase damping characteristics of exemplary embodiment damping air spring 224 in accordance with a specific cargo or load size, without changing the overall concept or operation of the present invention.

Accordingly, the damping air spring for heavy-duty vehicle axle/suspension system of the present invention is simplified; provides an effective, safe, inexpensive, and efficient structure and method, which achieves all the enumerated objectives; provides for eliminating difficulties encountered with prior art air springs; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. The present invention has been described with reference to a specific embodiment. It is to be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications, alterations, and equivalents thereof.

Having now described the features, discoveries and principles of the present invention, the manner in which the damping air spring for heavy-duty vehicle axle/suspension systems is constructed, arranged and used, the characteristics of the construction and arrangement, and the advantageous, new and useful results obtained; the new and useful structures, devices, elements, arrangements, parts and combinations are set forth in the claims.

What is claimed is:

1. An air spring for a heavy-duty vehicle axle/suspension system comprising:
    a bellows including a bellows chamber;
    a piston including a piston chamber, said bellows chamber being operatively connected to said piston chamber;
    at least one opening disposed between the bellows chamber and the piston chamber for restricted fluid communication between said bellows chamber and said piston chamber;
    wherein a ratio of a cross-sectional area of said at least one opening in square inches to a volume of the piston chamber in cubic inches to a volume of the bellows chamber in cubic inches to an estimated effective area of said air spring in square inches, is from about 1:600:1200:120 to about 1:14100:23500:1200; and
    wherein said air spring provides acceptable damping in a first critical frequency range of from about 0.8 Hz to about 2.0 Hz and in a second critical frequency range of from about 8.0 Hz to about 15 Hz.

2. The air spring of claim 1, said at least one opening including a total cross-sectional area in a range of from about 0.14 square inches to about 0.5 square inches.

3. The air spring of claim 2, said at least one opening including a total cross-sectional area of from about 0.20 square inches to about 0.5 square inches.

4. The air spring of claim 1, wherein a ratio of said volume of said bellows chamber to said volume of said piston chamber is less than 1.0.

5. The air spring of claim 1, wherein a ratio of said volume of said bellows chamber to said volume of said piston chamber is less than 0.5.

6. The air spring of claim 1, said piston further comprising a top plate, said top plate being between said bellows chamber and said piston chamber, said at least one opening being formed through the top plate.

7. The air spring of claim 6, said at least one opening including a plurality of openings formed through and distributed about said top plate.

8. The air spring of claim 1, wherein said bellows chamber has a volume of about 305 cubic inches to about 915 cubic inches.

9. The air spring of claim 1, wherein said piston chamber has a volume of about 450 cubic inches to about 6500 cubic inches.

10. The air spring of claim 1, wherein said air spring has a mean effective area in a range of from about 75 square inches to about 130 square inches.

11. The air spring of claim 1, said mean effective area further comprising a value from about 100 square inches to about 110 square inches.

12. An air spring comprising:
a bellows including a bellows chamber;
a piston including a piston chamber, said bellows chamber being operatively connected to said piston chamber;
at least one opening disposed between the bellows chamber and the piston chamber for restricted fluid communication between said bellows chamber and said piston chamber;
wherein a ratio of a cross-sectional area of said at least one opening in square inches to a volume of the piston chamber in cubic inches to a volume of the bellows chamber in cubic inches to a ratio of said volume of said bellows chamber to said volume of said piston chamber is from about 1:600:1200:0.001 to about 1:14100:23500:5.0; and
wherein said air spring provides acceptable damping in a first critical frequency range of from about 0.8 Hz to about 2.0 Hz and in a second critical frequency range of from about 8.0 Hz to about 15 Hz.

13. The air spring of claim 12, wherein a ratio of said volume of said bellows chamber to said volume of said piston chamber is less than 1.0.

14. The air spring of claim 12, wherein a ratio of said volume of said bellows chamber to said volume of said piston chamber is less than 0.5.

15. The air spring of claim 12, said at least one opening including a total cross-sectional area in a range of from about 0.14 square inches to about 0.50 square inches.

16. The air spring of claim 12, said at least one opening including a total cross-sectional area of from about 0.20 square inches to about 0.50 square inches.

17. The air spring of claim 12, said piston further comprising a top plate, said top plate being between said bellows and the piston, said at least one opening being formed through the top plate.

18. The air spring of claim 17, said at least one opening including a plurality of openings formed through and distributed about said top plate.

19. The air spring of claim 12, wherein said bellows chamber has a volume of about 305 cubic inches to about 915 cubic inches.

20. The air spring of claim 12, wherein said piston chamber has a volume of about 450 cubic inches to about 6500 cubic inches.

21. The air spring of claim 12, wherein said air spring has a mean effective area in a range of from about 75 square inches to about 130 square inches.

22. The air spring of claim 12, wherein said air spring has a mean effective area in a range of from about 100 square inches to about 110 square inches.

23. An air spring for a heavy-duty vehicle axle/suspension system comprising:
a bellows including a bellows chamber;
a piston including a piston chamber, said bellows chamber being operatively connected to said piston chamber;
at least one opening disposed between the bellows chamber and the piston chamber for restricted fluid communication between said bellows chamber and said piston chamber;
wherein a ratio of a cross-sectional area of said at least one opening in square inches to a volume of the piston chamber in cubic inches to a volume of the bellows chamber in cubic inches to an estimated effective area of said air spring in square inches, is from about 1:600:1200:120 to about 1:14100:23500:1200; and
wherein said cross-sectional area of the at least one opening is in a range of from about 0.14 square inches to about 0.5 square inches.

24. An air spring comprising:
a bellows including a bellows chamber;
a piston including a piston chamber, said bellows chamber being operatively connected to said piston chamber;
at least one opening disposed between the bellows chamber and the piston chamber for restricted fluid communication between said bellows chamber and said piston chamber;
wherein a ratio of a cross-sectional area of said at least one opening in square inches to a volume of the piston chamber in cubic inches to a volume of the bellows chamber in cubic inches to a ratio of said volume of said bellows chamber to said volume of said piston chamber is from about 1:600:1200:0.001 to about 1:14100:23500:5.0; and
wherein said cross-sectional area of the at least one opening is in a range of from about 0.14 square inches to about 0.5 square inches.

* * * * *